United States Patent
Yang et al.

(10) Patent No.: US 11,838,842 B2
(45) Date of Patent: Dec. 5, 2023

(54) METHOD AND DEVICE FOR CONTROLLING AN APPLICATION, AND STORAGE MEDIUM

(71) Applicant: BEIJING XIAOMI MOBILE SOFTWARE CO., LTD., Beijing (CN)

(72) Inventors: Fengqi Yang, Beijing (CN); Xuan Ma, Beijing (CN); Bo Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 200 days.

(21) Appl. No.: 17/240,029

(22) Filed: Apr. 26, 2021

(65) Prior Publication Data
US 2022/0046400 A1  Feb. 10, 2022

(30) Foreign Application Priority Data
Aug. 10, 2020 (CN) .......................... 202010797292.1

(51) Int. Cl.
  H04W 4/80 (2018.01)
  H04B 5/00 (2006.01)
  H04L 67/10 (2022.01)

(52) U.S. Cl.
  CPC ............ *H04W 4/80* (2018.02); *H04B 5/0031* (2013.01); *H04L 67/10* (2013.01)

(58) Field of Classification Search
  CPC ......... H04W 4/80; H04B 5/0031; H04L 67/10
  USPC ..................................................... 455/41.1
  See application file for complete search history.

(56) References Cited

U.S. PATENT DOCUMENTS

| 10,725,972 | B2* | 7/2020 | Chan ..................... H04W 12/06 |
| 11,303,681 | B2* | 4/2022 | Chen ................... H04N 21/8545 |
| 2011/0145859 | A1* | 6/2011 | Novack ................ H04N 21/458 725/38 |
| 2015/0245398 | A1* | 8/2015 | Cserna ..................... H04L 69/24 455/41.1 |
| 2015/0286738 | A1* | 10/2015 | Liu ..................... G06F 16/9577 715/234 |
| 2016/0321644 | A1* | 11/2016 | Zeng ................... G06Q 20/3276 |
| 2018/0101195 | A1* | 4/2018 | Meriaz .................. G06F 1/1654 |
| 2019/0068447 | A1* | 2/2019 | Baribault ................. H04M 3/42 |

FOREIGN PATENT DOCUMENTS

CN         110958475 A       4/2020

OTHER PUBLICATIONS

Chinese Patent Application No. 202010797292.1, Office Action dated Feb. 2, 2021, 14 pages.
Chinese Patent Application No. 202010797292.1, English translation of Office Action dated Feb. 2, 2021, 14 pages.
European Patent Application No. 21171418.3 extended Search and Opinion dated Oct. 12, 2021, 7 pages.

* cited by examiner

*Primary Examiner* — April G Gonzales
(74) *Attorney, Agent, or Firm* — COZEN O'CONNOR

(57) ABSTRACT

A method for controlling an application includes: triggering reading information of a second device included in a near-field communication (NFC) sensor in response to a distance between a first device and the NFC sensor reaching an NFC effective communication distance, and determining the second device based on the information of the second device; determining a function currently executed by the first device, and determining a capability of the second device; and switching to the second device to continue to execute the function in response to the capability of the second device matching the function.

19 Claims, 8 Drawing Sheets

METHOD AND DEVICE FOR CONTROLLING AN APPLICATION, AND STORAGE MEDIUM

CROSS-REFERENCE TO RELATED APPLICATIONS

This application claims the benefit of priority to Chinese Application No. 202010797292.1, filed on Aug. 10, 2020, the contents of which are incorporated herein by reference in their entirety.

TECHNICAL FIELD

The present disclosure relates to an application control field, and in particular to, a method for controlling an application, an apparatus for controlling an application and a storage medium.

BACKGROUND

With development of communication technologies, more and more functions are realized in a terminal. For example, when a user has a plurality of terminals, functions are switched between the plurality of terminals. For example, for a music played on the terminal such as a mobile phone, it can be switched to another device such as a speaker to play the music, and then it can be switched back to the mobile phone to play the music.

With rapid development of technologies and rapid iteration of information, the user has an increasing demand for switching various functions between the terminal and other devices.

SUMMARY

To overcome the problems in the related art, embodiments of the disclosure provide a method for controlling an application, an apparatus for controlling an application and a storage medium.

In a first aspect of embodiments of the disclosure, there is provided method for controlling an application. The method includes: triggering reading of information of a second device included in a near-field communication (NFC) sensor in response to a distance between a first device and the NFC sensor external to the first device reaching an NFC effective communication distance, and determining the second device based on the information of the second device; determining a function currently executed by the first device, and determining a capability of the second device; and switching to the second device to continue to execute the function in response to determining that the capability of the second device matches the function.

In a second aspect of embodiments of the disclosure, there is provided a method for controlling an application. The method includes: triggering a second device to continue to execute a function currently executed by a first device in response to a distance between the first device and an NFC sensor external to the first device reaching an NFC effective communication distance and a capability of the second device matching the function.

In a third aspect of embodiments of the disclosure, there is provided a method for writing NFC information. The method includes generating information of a second device and writing the information of the second device into an external NFC sensor, in response to a first device approaching the external NFC sensor and entering an effective communication range of the external NFC sensor and in response to determining that the information of the second device is not written in the external NFC sensor. Or the method includes generating information of a second device; and writing the information of the second device into an external NFC sensor in response to a first device approaching the external NFC sensor and entering an effective communication range of the external NFC sensor.

In a fourth aspect of embodiments of the disclosure, there is provided an apparatus for controlling an application. The apparatus includes: a triggering module, a determining module and a processing module. The triggering module is configured to trigger reading of information of a second device included in a near-field communication (NFC) sensor in response to a distance between a first device and the NFC sensor external to the first device reaching an NFC effective communication distance, and to determine the second device based on the information of the second device. The determining module is configured to determine a function currently executed by the first device, and to determine a capability of the second device. The processing module is configured to switch to the second device to continue to execute the function in response to determining that the capability of the second device matches the function.

In a fifth aspect of embodiments of the disclosure, there is provided an apparatus for controlling an application. The apparatus includes: a determining module and a processing module. The determining module is configured to determine whether a distance between the first device and an external NFC sensor reaches an NFC effective communication distance. The processing module is configured to trigger a second device to continue to execute a function currently executed by a first device in response to the distance between the first device and the external NFC sensor reaching the NFC effective communication distance and a capability of the second device matching the function.

In a sixth aspect of embodiments of the disclosure, there is provided an apparatus for writing NFC information. The apparatus includes a generating module and a writing module. The generating module is configured to generate information of a second device and write the information of the second device into an external NFC sensor, in response to a first device approaching the external NFC sensor and entering an effective communication range of the external NFC sensor and in response to determining that the information of the second device is not written in the external NFC sensor. Or the generating module is configured to generate information of a second device. The writing module is configured to write the information of the second device into an external NFC sensor in response to a first device approaching the external NFC sensor and entering an effective communication range of the external NFC sensor.

In a seventh aspect of embodiments of the disclosure, there is provided a device for controlling an application. The device includes: a processor and a memory for storing instructions executable by the processor. The processor is configured to execute the instructions for controlling an application according to the first aspect or any implementation of the first aspect, or the instructions for controlling an application according to the second aspect or any implementation of the second aspect.

In an eighth aspect of embodiments of the disclosure, there is provided a device for writing NFC information. The device includes: a processor and a memory for storing instructions executable by the processor. The processor is configured to execute the instructions for writing NFC information according to the third aspect or any implementation of the third aspect.

In a ninth aspect of embodiments of the disclosure, there is provided a non-transitory computer-readable storage medium, in which when the instructions in the storage medium are executed by a processor of a mobile terminal, the mobile terminal is caused to execute the instructions for controlling an application according to the first aspect or any implementation of the first aspect, or the instructions for controlling an application according to the second aspect or any implementation of the second aspect.

In a tenth aspect of embodiments of the disclosure, there is provided a non-transitory computer-readable storage medium, in which when the instructions in the storage medium are executed by a processor of a mobile terminal, the mobile terminal is caused to execute the instructions for writing NFC information according to the third aspect or any implementation of the third aspect.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a portion of the specification and illustrate embodiments in accordance with the disclosure, and the drawings together with the specification are used to explain the principle of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

With development of science and technology, microprocessors, sensors, and network communication technologies are gradually introduced into home appliances to form smart home appliances. A smart home is composed of various smart home appliances and network communications, and control of the smart home is realized through users' terminals.

The present disclosure provides a method for controlling an application, different functions executed on the first device can be continuously executed on the second device according to different functions currently executed by the first device and the capability of the second device. It should be understood that relevant information of the device that can realize function switching through communication is stored in a short-range communication device such as NFC sensor. Further, in the embodiments of the present disclosure, for ease of description, the device that currently executes the function is called the first device, and the device that interacts with the first device and continuously executes the function currently executed on the first device is called the second device. In the following embodiments, the method for controlling an application provided in the present disclosure is described with reference to the first device and the second device.

Figure 1:
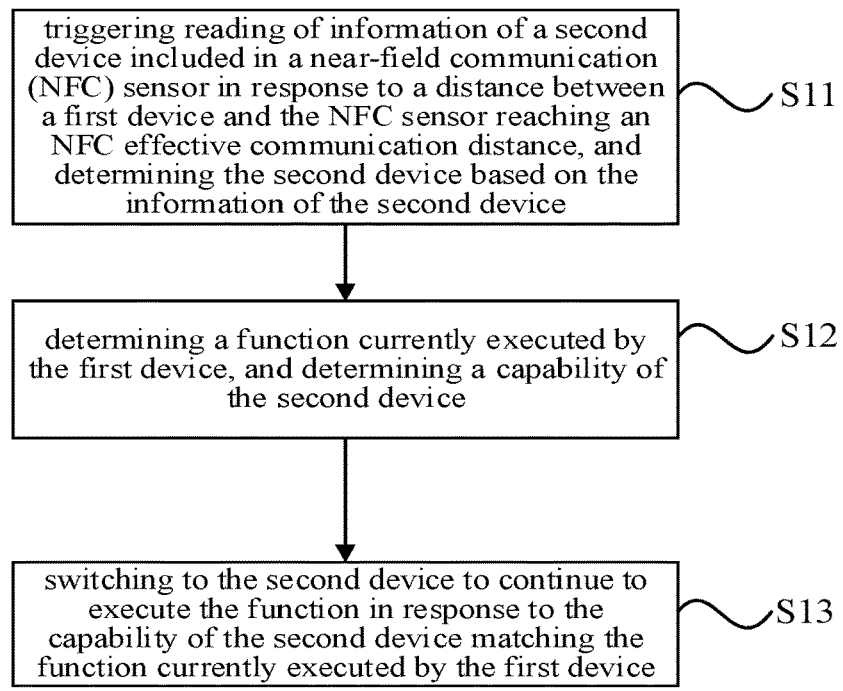
FIG. 1 is a flowchart of a method for controlling an application according to an embodiment.

FIG. 1 is a flowchart of a method for controlling an application according to an embodiment.

In an embodiment, as illustrated in FIG. 1, the method includes steps S11 to S13. The steps are described respectively below.

At step S11, reading of information of a second device included in a near-field communication (NFC) sensor is triggered in response to a distance between a first device and the NFC sensor external to the first device reaching an NFC effective communication distance, and the second device is determined based on the information of the second device.

In the embodiment of the present disclosure, the external NFC sensor can be understood as an NFC sensor that is independent of the first device and the second device. A location where the external NFC sensor is installed is not specifically limited. The external NFC sensor performs NFC based on NFC technologies. The NFC between the first device and the external NFC sensor can be understood as follows, the first device enters an effective communication range of the external NFC sensor, and the NFC sensor generates an NFC signal and performs instant information interaction with the first device based on the NFC signal to realize functions such as information interaction.

It can be understood that related information on the second device may be pre-stored or written in the external NFC sensor involved in the embodiments of the present disclosure, and the second device may be determined according to the information of the second device.

In the present disclosure, when the first device approaches the external NFC sensor and reaches the NFC effective communication distance, the information of the second device included in the NFC sensor can be read, and the second device is determined according to the information of the second device.

At step S12, a function currently executed by the first device is determined, and a capability of the second device is determined.

In an embodiment, the function currently executed by the first device is determined. In an example, the first device may be a mobile terminal, and the function currently executed by the first device may be, for example, an audio playback function, and a video call function and so on.

In an embodiment, the capability of the second device is further determined based on the determined second device.

In another embodiment, the capability of the second device can be determined by receiving capability indicator information sent by a cloud server. The capability indicator information represents one or more corresponding capabilities of the second device for executing the function executed by the application running in the first device.

In an example, referring to the above example that the function currently executed by the first device is a video call function, the second device capable of performing the video call function may be determined by the cloud server, for example, the second device may be a device that has a voice playback capability in executing the video call function. The second device may also be a device that has an image display capability in executing the video call function. The second device may also be a device that has both the voice playback capability and the image display capability in executing the video call function.

In another embodiment, the determination of the capability of the second device can be achieved in the following manner.

Capability information of the second device which is pre-stored is determined or the capability information of the second device sent by the second device is received, and one or more corresponding capabilities of the second device for executing the function executed by the application running in the first device are determined based on the capability information of the second device.

In an application process, one or more functions that can be executed by the second device in the process of executing the function executed by the application running in the first device can be determined according to the pre-stored or received capability information of the second device sent by the second device. In an example, if the first device is a mobile terminal that executes a video call function, according to the pre-stored voice playback function of the second device, it can be determined that the second device can perform the function related to voice playback in the video call function in the process of executing the video call function running in the first device.

At step S13, it is switched to the second device to continue to execute the function in response to the capability of the second device matching the function currently executed by the first device.

In the application process, when it is determined that the capability of the second device matches the function currently executed by the first device, the function currently executed by the first device can be switched to the second device such that the second device may continue to perform the function.

In a possible embodiment, the second device may launch the function currently executed by the first device through its own hardware or software. Further, the first device may also display relevant information indicating that the second device at present synchronously executes the function currently executed by the first device. In another possible embodiment, the second device receives data related to the function currently executed by the first device through data transmission with the first device, and based on the data, the function currently executed by the first device is executed in the second device.

It should be noted that the first device and the second device may be located in the same local area network, a connection through communication is established, and the data related to the function currently executed by the first device is sent to the second device through a communication transmission mode. In another example, the first device may send the data related to the function currently executed by the first device to the second device through an ultrasonic transmission mode. In another example, the first device may also send the data related to the function currently executed by the first device to the second device through a Bluetooth transmission mode.

It can be understood that the present disclosure does not limit the transmission mode for sending the data related to the function currently executed by the first device to the second device, as long as the complete data transmission is realized during the application process.

According to the method for controlling an application provided in the present disclosure, when the distance between the first device and the external NFC sensor reaches the NFC effective communication distance, reading of the information of the second device included in the NFC sensor is triggered, and the function currently executed by the first device and the capability of the second device are determined. Moreover, it is possible to quickly and conveniently switch to the second device to perform different functions matching the capability of the second device according to the different functions currently executed by the first device based on the functions currently executed by the first device and the capability of the second device.

In the present disclosure, when the second device does not have the capability to perform all of the function currently executed by the first device, the second device may also continue to perform a part of the function that matches the capability of the second device.

The following embodiment of the present disclosure will describe the process in which the second device continues to perform a part of the function matching the capability of the second device.

Figure 2:
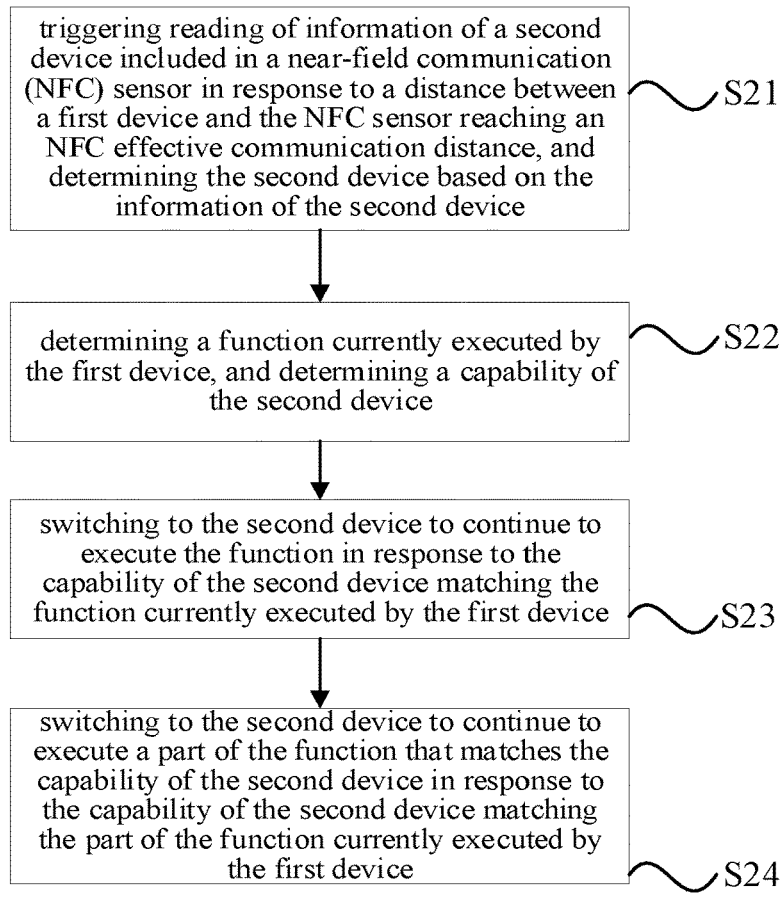
FIG. 2 is a flowchart of a method for controlling an application according to another embodiment.

FIG. 2 is a flowchart of a method for controlling an application according to an embodiment.

In an embodiment of the present disclosure, as illustrated in FIG. 2, the method includes steps S21 to S24. The steps are described respectively below.

It should be noted that steps S21 to S23 are the same as steps S11 to S13 respectively in the previous embodiment. For related explanations, descriptions and beneficial effects, reference can be made to the above descriptions of steps S11 to S13, which are not repeated here. Step S24 will be described in detail below.

At step S24, it is switched to the second device to continue to execute a part of the function currently executed by the first device in response to the capability of the second device matching the part of the function currently executed by the first device.

In a possible embodiment of the present disclosure, when the second device does not have the capability to perform all of the function currently executed by the first device, but has the capability to perform a part of the function currently executed by the first device, the part of the function currently executed in the first device can be switched to the second device such that the second device may continue to perform the part of the function matching the capability of the second device.

In an example, the first device may be a mobile terminal, and all of the function currently executed by the first device is the video call function. The second device may be a device that does not have an image display function but has a voice playback function, such as, a speaker. When it is detected that the second device (a speaker) does not have the image display function but has the voice playback function, and since the voice playback function of the second device (the speaker) can be used to play the relevant audio in the video call function currently executed by the first device (a mobile terminal), it is possible to switch to the second device (the speaker) to continue to execute the audio playback function in the voice call function currently executed by the first device (the mobile terminal).

Through the embodiments of the present disclosure, under the premise that the second device does not have a capability to execute all of the function of the first device, it is still possible to switch the functions between the second device and the first device quickly and conveniently, to improve user experience and satisfaction during use.

In the present disclosure, the cloud server can be used to determine whether the capability of the second device matches the function currently executed by the first device, thereby reducing the calculation amount of the first device or the second device in the process of determining whether the capability of the second device matches the function currently executed by the first device and increasing the operating speed of the first device or the second device, so as to increase the user experience in the process of using the first device or the second device.

The following embodiment of the present disclosure will describe the process of determining whether the capability of the second device matches the function currently executed by the first device through the cloud server.

Figure 3:
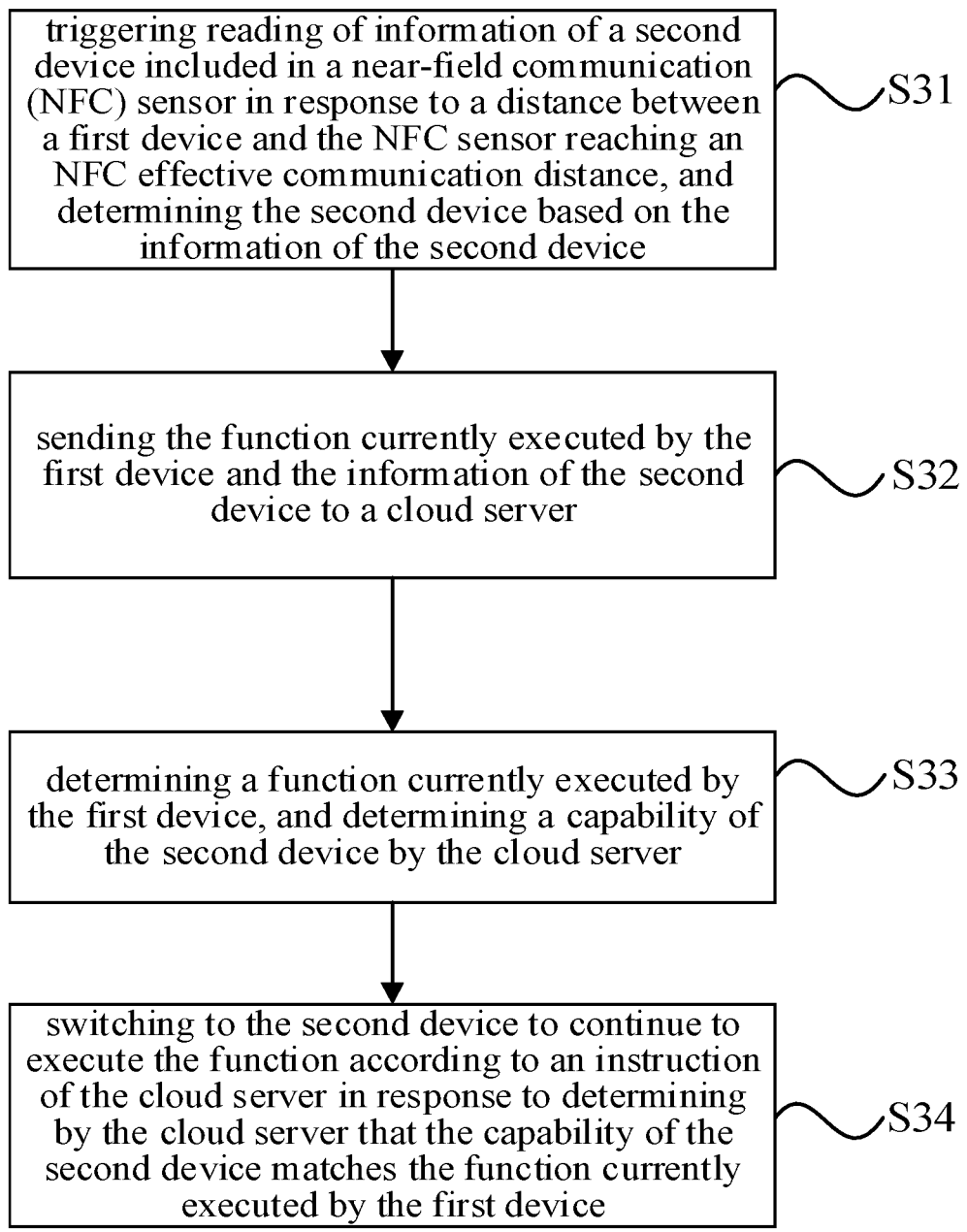
FIG. 3 is a flowchart of a method for controlling an application according to a still embodiment.

FIG. 3 is a flowchart of a method for controlling an application according to an embodiment.

In an embodiment of the present disclosure, as illustrated in FIG. 3, the method includes steps S31 to S34. The steps are described respectively below.

At step S31, reading of information of a second device included in a near-field communication (NFC) sensor is triggered in response to a distance between a first device and the NFC sensor external to the first device reaching an NFC effective communication distance, and the second device is determined based on the information of the second device;

At step S32, a function currently executed by the first device and the information of the second device are sent to a cloud server.

At step S33, the function currently executed by the first device is determined, and a capability of the second device is determined by the cloud server.

At step S34, it is switched to the second device to continue to execute the function according to an instruction of the cloud server in response to determining by the cloud server that the capability of the second device matches the function currently executed by the first device.

Step S31 is the same as step S11 in the foregoing embodiment. For related explanations, descriptions and beneficial effects, reference can be made to the above descriptions of step S11, which are not repeated here. Steps S32 to S34 are described in detail below.

In the embodiment of the present disclosure, the function currently executed by the first device and the information of the second device are sent to the cloud server, so that the cloud server determines whether the capability of the second device matches the capability required by the function currently executed by the first device.

It should be noted that due to software or capability of the second device, corresponding updates can be made according to actual conditions. The update status of the second device is transmitted to the cloud server in real time, so that the cloud server may determine whether the capability matches the function currently executed by the first device according to the capability of the second device.

When the cloud server determines that the capability of the second device matches the function currently executed by the first device, it is switched to the second device to continue to execute the function currently executed by the first device. In another possible embodiment, when the cloud server determines that the capability of the second device matches the function currently executed by the first device, it is also possible to switch to the second device to continue to perform the function currently executed by the first device according to an instruction from the cloud server.

In the embodiment of the present disclosure, the cloud server is used to determine whether the capability of the second device matches the function currently executed by the first device, thereby reducing the calculation amount of the first device or the second device in the process of determining whether the capability of the second device matches the function currently executed by the first device and increasing the operating speed of the first device or the second device, so as to increase the user experience in the process of using the first device or the second device.

In the embodiment of the present disclosure, when the function currently executed by the first device includes a function executed by a current Active APP of the first device, the method for controlling an application described in the embodiments of the present disclosure can be used to realize the function switching between the first device and the second device. The current Active APP of the first device can be understood as an application currently running on the first device.

The following embodiment of the present disclosure will describe the process of determining whether the capability of the second device matches the function currently executed by the first device when the function currently executed by the first device includes the current Active APP of the first device and the function currently executed by the Active APP.

In an embodiment of the present disclosure, the function currently executed by the first device includes the current Active APP of the first device and the function currently executed by the Active APP, the capability of the second device includes hardware of the second device and/or applications currently installed on the second device.

In an example, if the second device has the capability to execute all of the function currently executed by the first device, the following methods are used to determine that the capability of the second device matches the function currently executed by the first device.

In an application process, it can be determined that the capability of the second device matches the function currently executed by the first device, in response to the second device being installed with the Active APP of the first device or an application with the same function as the function currently executed by the Active APP or an application with the same function as a part of the function currently executed by the Active APP, or the second device being capable of installing with the Active APP. Or hardware required to execute the function can be determined according to the function currently executed by the first device and it can be determined that the capability of the second device matches the function currently executed by the first device in response to the second device having the hardware required to execute the function.

In an embodiment, for example, the current Active APP of the first device is a currently running WeChat application, and the current function executed by the currently running WeChat application is a video call function. In an example, by determining that the current Active APP (WeChat application) is installed on the second device, it can be determined that the capability of the second device matches the function currently executed by the first device, and further, the video call function currently executed by the first device can be switched to the second device so that the second device may continue to execute the function. In another example, when it is determined that the second device is installed with an application with the same function as the video call function executed by the currently running WeChat application of the first device, such as the QQ application with the video call function, it can be determined that the capability of the second device matches the function currently executed by the first device, and further, the video call function currently executed by the first device can be switched to the second device so that the second device may continue to execute the function. In yet another example, when it is determined that an application with the same function as a part of the video call function executed by the currently running WeChat application of the first device is installed on the second device, for example, an application with the audio call function, it can be determined that the capability of the second device matches the part of the function currently executed by the first device, and then the video call function currently executed by the first device can be switched to the second device so that the second device may continue to perform the part of the function, namely, the video call function currently executed by the first device is switched to the second device so that the second device may continue the audio call function. In another example, when it is determined that the WeChat application can be installed on the second device, that is, it is determined that the second device has the capability to install the WeChat application, it can be determined that the capability of the second device matches the function currently executed by the first device. Further, after the WeChat application is installed on the second device (the installation can be automatically instructed), the video call function currently executed by the first device can be switched to the second device so that the second device may continue to execute the function.

In another embodiment, according to the video call function currently executed by the first device, if the second device can execute this function, the second device at least needs to have a display screen capable of displaying images and an audio playback component capable of playing audio to public. If the second device has at least the above two kinds of hardware, it indicates that the capability of the second device matches the video call function currently executed by the first device, and further, the video call function currently executed by the first device can be switched to the second device so that the second device may execute the function.

In another example, if the second device has the capability to execute a part of the function currently executed by the first device, it can be determined that the capability of the second device matches the part of the function currently executed by the first device in the following manner.

In an application process, the hardware required to execute the function can be determined according to the function currently executed by the first device, and it can be determined that the capability of the second device matches the function currently executed by the first device in response to the second device having a part of the hardware required to execute the function and the part of the hardware being capable of executing the part of the function.

In an embodiment, for example, the current Active APP of the first device is the currently running WeChat application, and the current function executed by the currently running WeChat application is a video call function. According to the video call function currently executed by the first device, if the second device is able to execute the function, the second device at least needs to have a display screen capable of displaying images, or an audio playback component capable of playing audio to public. If the second device has one of the above two kinds of hardware, it indicates that the capability of the second device matches the video call function currently executed by the first device, and further, a part of the video call function currently executed by the first device can be switched to the second device so that the second device may continue to execute the part of the function.

The following embodiment of the present disclosure will describe the process of switching to the second device to continue to execute the function.

In an embodiment of the present disclosure, it is possible to control the first device to stop executing the function and determine an application running breakpoint, and to switch to the second device to execute the function from the application running breakpoint. Or it is possible to determine a current operating point of the function currently executed by the first device, and to control the second device to execute the function from the current operating point.

In an example, when switching to the second device to continue to execute the function currently executed by the first device, the second device is controlled to stop executing the function, and the time point at which the function stops is determined, that is, it is determined that, a running breakpoint of the application currently running on the first device is determined. At this time, if it is switched to the second device to execute the function, the function is continuously executed from the running breakpoint. In an example, when the application currently running on the first device is playing music, if the running breakpoint of the application is at the $95^{th}$ second of the music, the second device may play the music from the $95^{th}$ second of the music.

In another example, when switching to the second device to continue to execute the function currently executed by the first device, the current running point of the function executed by the first device can be determined. In this case, if it is switched to the second device to execute the function, the function is continuously executed from the current running point of the application currently running on the first device. In an example, when the application currently running on the first device is playing music, if the current running point of the function executed by the first device is at the $95^{th}$ second of the music, the second device may continue to play the music from the $95^{th}$ second of the music.

It should be noted that when the second device continues to execute the function executed by the first device, information may also be displayed on the display interface of the first device, so that the user can understand the status of the second device executing the function.

In the embodiments of the present disclosure, by switching the function executed by the first device to the second device, the second device may execute the function. Therefore, if the second device has the same or corresponding function as the first device, it is useful for implementing the method for controlling an application of the present disclosure. In an example, at least one application running on the second device when switching to the second device and a function corresponding to the at least one application may be preset to determine whether the application running on the first device belongs to the preset at least one application.

The following embodiment of the present disclosure will describe the process of implementing the method for controlling an application based on presetting at least one application running on the second device when switching to the second device.

Figure 4:
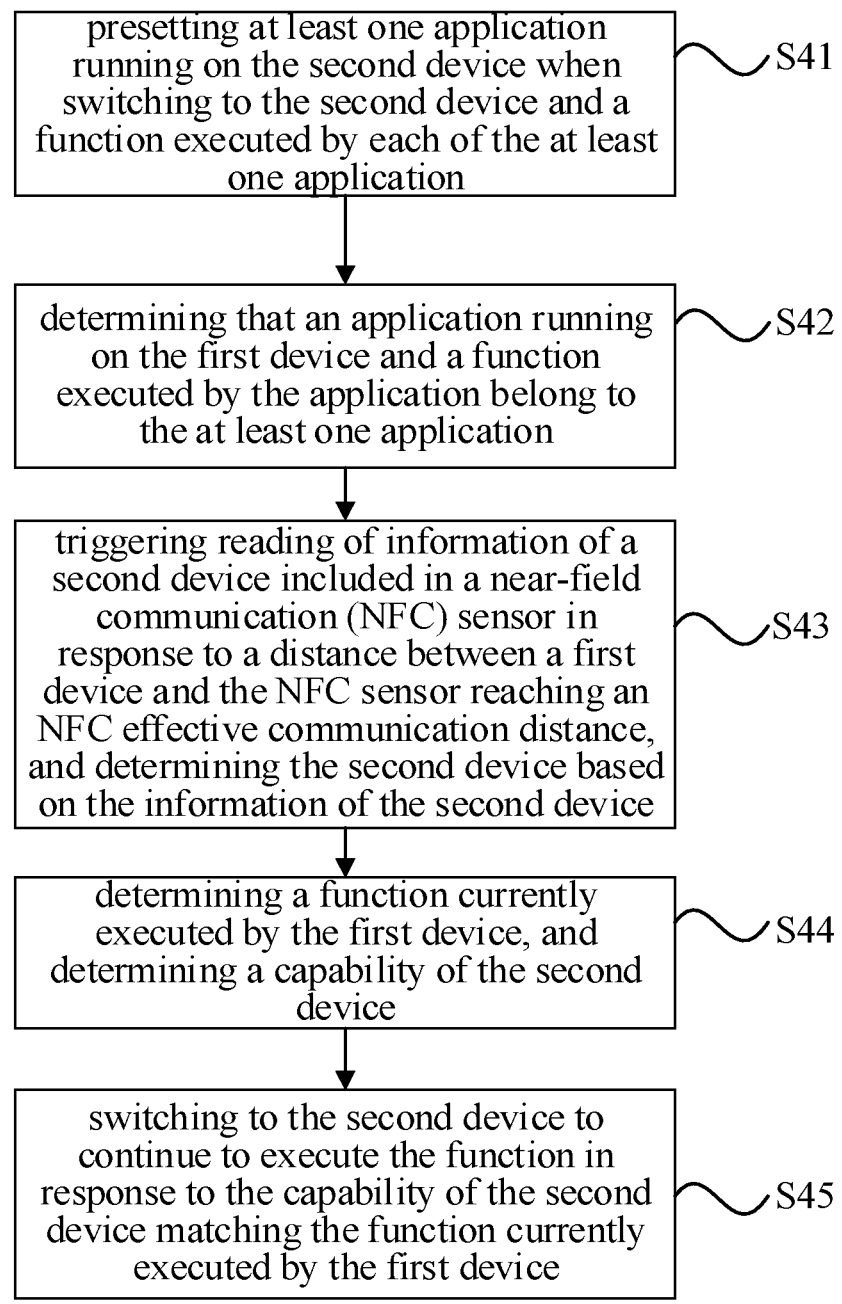
FIG. 4 is a flowchart of a method for controlling an application according to a yet embodiment.

FIG. 4 is a flowchart of a method for controlling an application according to an embodiment.

In an embodiment, as illustrated in FIG. 4, the method includes steps S41 to S45, the steps are described respectively below.

At step S41, at least one application running on the second device when switching to the second device and a function executed by each of the at least one application are preset.

At step S42, it is determined that an application running on the first device and a function executed by the application belong to the at least one application.

At step S43, reading of information of a second device included in an NFC sensor is triggered in response to a distance between a first device and the NFC sensor external to the first device reaches an NFC effective communication distance, and the second device is determined based on the information of the second device.

At step S44, a function currently executed by the first device is determined, and a capability of the second device is determined.

At step S45, it is switched to the second device to continue to execute the function in response to the capability of the second device matching the function currently executed by the first device.

Steps S43 to S45 are the same as steps S11 to S13 in the above embodiment. For related explanations, descriptions and beneficial effects, reference may be made to the above descriptions of steps S11 to S13, which are not repeated here. Steps S41 and S42 are described in detail below.

In the embodiment of the present disclosure, when the second device has the same or corresponding function as the first device, it is ensured that the second device may execute the function executed by the first device successfully. In an application process, at least one application running on the second device when switching to the second device and the function executed by the at least one application are preset. Further, it is determined whether the application running on the first device and the function executed by the application belong to the preset at least one application of the second device. If the application running on the first device and the function executed by the application belong to the preset at least one application of the second device, it indicates that the second device has an application corresponding to the application currently running on the first device, the function currently executed by the first device is switched to the second device for execution, thus ensuring the execution effect of the second device. In an embodiment, the information of the second device relates to a plurality of second devices. Therefore, an optimal second device is selected from the plurality of second devices to execute the function currently executed by the first device.

The following embodiment of the present disclosure will describe the process of selecting the optimal second device from the plurality of second devices to execute the function currently executed by the first device.

Figure 5:
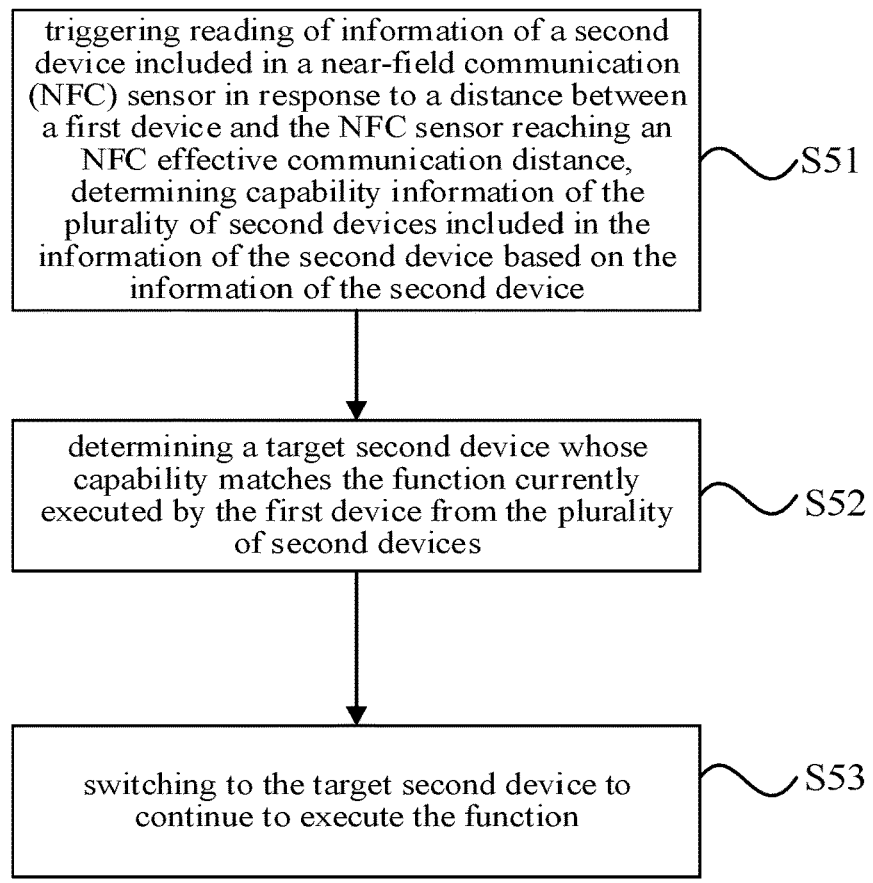
FIG. 5 is a flowchart of a method for controlling an application according to a still yet embodiment.

FIG. 5 is a flowchart of a method for controlling an application according to an embodiment.

In an embodiment, as illustrated in FIG. 5, the method includes steps S51 to S53. The steps are described respectively below.

At step S51, reading of information of a second device included in an NFC sensor is triggered in response to a distance between a first device and the NFC sensor external to the first device reaches an NFC effective communication distance, capability information of the plurality of second devices included in the information of the second device is determined based on the information of the second device.

At step S52, a target second device whose capability matches the function currently executed by the first device is selected from the plurality of second devices.

At step S53, it is switched to the target second device to continue to execute the function.

In an application process, based on the capability information of the plurality of second devices included in the information of the second device, it is determined that the capability of the second device matches the function currently executed by the first device, and it is switched to the second device to continue to execute the function currently executed by the first device. In an example, it may be determined that there are a plurality of second devices each having a capability to execute the function executed by the first device. However, since each second device has different effects in executing the function executed by the first device, it is possible to determine a second device with the highest matching rate with the function currently executed by the first device from the plurality of the second devices as the target second device, and it is switched to the target second device to continue to execute the function. In this way, the effect of the target second device executing the function executed by the first device is guaranteed.

In the embodiment, by determining the second device with the highest matching rate with the function currently executed by the first device as the target second device from the plurality of the second devices, and it is switched to the target second device to continue to execute the function. In this way, it may be ensured that the effect of the target second device executing the function executed by the first device is optimal, which may further improve user experience and satisfaction during use.

In an embodiment, it is also possible to determine the target second device whose capability matches the function currently executed by the first device from the plurality of second devices in the following manner.

In an embodiment, a second device having the shortest distance from the first device is determined from the plurality of the second devices as the target second device in response to the plurality of second devices having the same capability. Or, in response to the plurality of the second devices having different capabilities, if there is merely one of the plurality of second devices has the capability matching the function currently executed by the first device, the second device may be determined as the target second device, however, if there are at least two second devices that both have the capability matching the function currently executed by the first device (including matching a part of the function), the second device with the strongest capability for executing the function among the plurality of second devices is determined as the target second device. Or, based on preset device priorities, the second device with the highest priority for executing the function among the plurality of second devices is determined as the target second device.

Further, the strength of the capabilities of the plurality of the second devices can be preset according to the user habits. In an embodiment, the plurality of second devices are installed with applications that can implement the function currently executed by the first device, then the second device where the application with the strongest capability for executing the function is located is determined as the target second device with the strongest capability. Or, in the plurality of second devices, if there is a second device that can execute all of the function currently executed by the first device (for example, a speaker with a screen can continue to execute a video call of a mobile phone) and there is a second device that can execute a part of the function currently executed by the first device (for example, a speaker without a screen can merely continue to execute an audio call of the video call of a mobile phone), then the second device that can execute all of the function is determined as the target second device with the strongest capability. Or, in the plurality of the second devices each of which can execute all of the function of the first device, if there is a second device having a better hardware performance for performing the function currently executed by the first device than that other second devices (for example, although both a TV and a speaker with a screen can continue to execute a video call of a mobile phone, the screen size of the TV is larger than that of the speaker, thus the TV has the better hardware performance for execute the video call. In another example, it may also be considered that the smaller screen has better capability in some applications, which can be set based on actual conditions and is not limited herein), then the second device with better hardware performance is determined as the target second device with strongest capability.

The software installed on the second device and its version, the hardware of the second device and its performance, and the hardware parameter configuration are provided to the terminal or a server in advance for use in comparing the plurality of second devices when determining the second device.

In another implementation, the user can also determine the target second device from the plurality of second devices according to his own preferences.

The following embodiment of the present disclosure will describe the method for controlling an application involved in the above embodiments in combination with practical applications.

Figure 6:
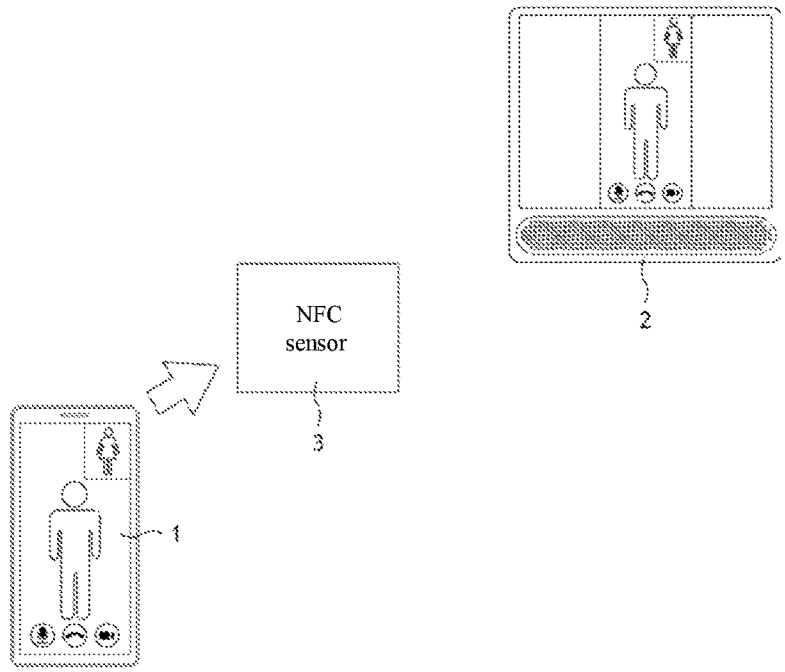
FIG. 6 is a schematic diagram of an application scenario in which the method for controlling an application shown in an embodiment of the present disclosure is applied.

FIG. 6 is a schematic diagram of an application scenario in which the method for controlling an application shown in an embodiment of the present disclosure is applied.

In an embodiment, as illustrated in FIG. 6, the first device is a mobile terminal 1, the second device is a speaker 2, and the application running on the mobile terminal 1 is a video call function. In an application process, when the mobile terminal 1 approaches an external NFC sensor 3, and a distance between the mobile terminal 1 and the external NFC sensor 3 reaches an effective NFC communication distance, reading of information of the speaker 2 included in the NFC sensor 3 is triggered. It should be noted that the external NFC sensor 3 is a device independent of the first device and the second device. In this disclosure, a location of the external NFC sensor 3 is not specifically limited.

Based on the information of the speaker 2, the speaker 2 and the capability of the speaker 2 can be determined. For example, the speaker 2 has a voice playback function.

Further, it can be determined that the function executed by the application currently running on the mobile terminal 1 is a video call function. Moreover, when it is determined that the voice playback function of the speaker 2 matches a function for playing voice in the video call function currently executed by the mobile terminal 1, the function of playing voice in the video call function currently executed with the mobile terminal 1 can be switched to the speaker 2 for continuous execution.

In an example, it is also possible to display on the interface of the mobile terminal 1 information indicating that the speaker 2 is executing the function for playing voice in the video call function, so that the user understands the execution status of the switched function of the speaker 2.

In another example, the speaker 2 may be updated with hardware and software, so that in addition to the voice playback function, the speaker 2 also has an image display function, that is, the updated speaker 2 has all of capabilities required for the video call function. In this case, it may be switched to the speaker 2 to continue to execute all of the video call function of the mobile terminal 1.

It can be seen from the above descriptions that with the method for controlling an application according to the present disclosure, the reading of the information of the second device included in the NFC sensor is triggered when the distance between the first device and the NFC sensor external to the first device reaches the effective NFC communication distance, and the function currently executed by the first device and the capability of the second device are determined. Based on the functions currently executed by the first device and the capability of the second device, it is possible to quickly and conveniently switch to the second device to execute different functions matching the capability of the second device according to the different functions currently executed by the first device.

Based on the same concept, embodiments of the present disclosure further provide a method for controlling an application, which is applied to the second device.

Figure 7:
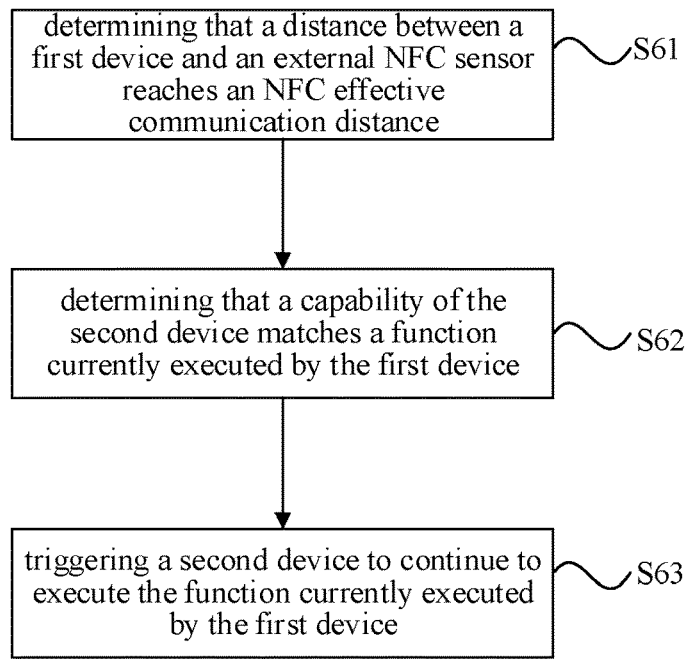
FIG. 7 is a flowchart of a method for controlling an application according to a still yet embodiment.

FIG. 7 is a flowchart of a method for controlling an application according to an embodiment.

In an embodiment of the present disclosure, the method includes steps S61 to S63. The steps are described respectively below.

At step S61, it is determined that a distance between a first device and an external NFC sensor reaches an NFC effective communication distance.

At step S62, it is determined that a capability of the second device matches a function currently executed by the first device.

At step S63, the second device is triggered to continue to execute the function.

Since steps S61 to S63 are steps corresponding to steps S11 to S13 in the above embodiment, for related explanations and descriptions and beneficial effects, reference can be made to the above descriptions of steps S11 to S13, which are not repeated here.

In an embodiment of the present disclosure, in addition to steps S61 to S63 described above, the method further includes the following steps.

The second device is triggered to continue to execute a part of the function that matches the capability of the second device in response to the capability of the second device matching the part of the function currently executed by the first device.

In an embodiment, under the premise that the second device does not have a capability to execute all of the function of the first device, it is still possible to switch the functions between the second device and the first device quickly and conveniently, so as to improve the user experience and satisfaction during use.

In an embodiment, when the function currently executed by the first device includes a current Active APP of the first device, the method described in the embodiment of the present disclosure can be used to realize the function switching between the first device and the second device. The current Active APP of the first device can be understood as an application currently running on the first device.

In an example, the function currently executed by the first device includes a current Active APP of the first device and a function currently executed by the current Active APP, and the capability of the second device includes hardware provided by the second device and/or applications currently installed on the second device. The capability of the second device matching the function currently executed by the first device may be achieved by the following manners: the second device being installed with the current Active APP of the first device or an application with the same function as the function currently executed by the current Active APP, or the second device being capable of installing with the current Active APP, or the second device having hardware required to execute the function.

In another example, the function currently executed by the first device includes a current Active APP of the first device and a function currently executed by the Active APP, and the capability of the second device includes hardware provided by the second device and/or applications currently installed on the second device. The capability of the second device matching a part of the function currently executed by the first device can be achieved by the following manners: the second device having a part of the hardware required to execute the function and the part of the hardware being capable of executing the part of the function.

Figure 8:
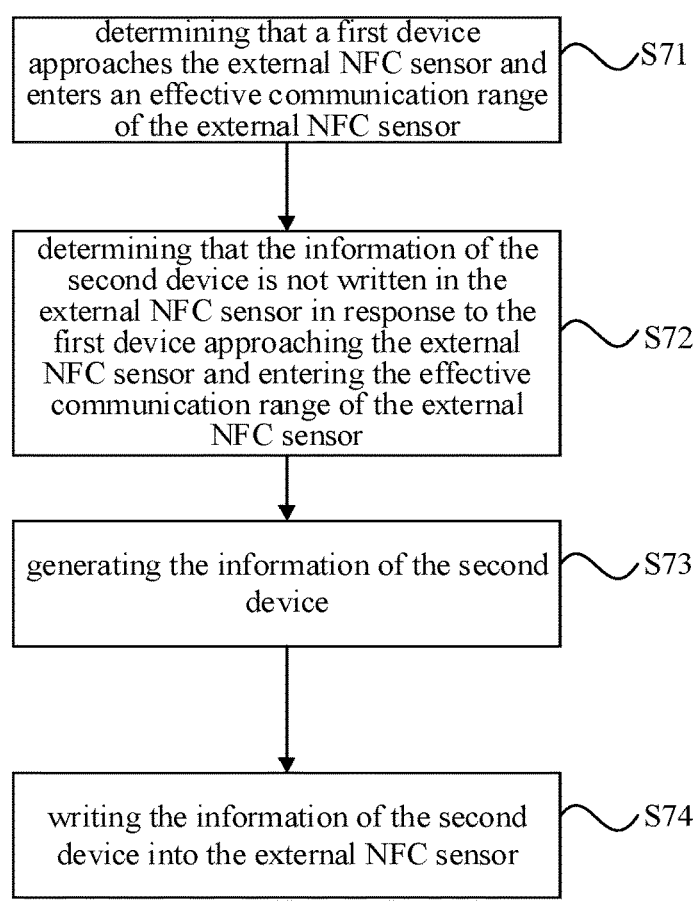
FIG. 8 is a flowchart of a method for writing NFC information according to an embodiment of the present disclosure.

FIG. 8 is a flowchart of a method for writing NFC information according to an embodiment of the present disclosure. As illustrated in FIG. 8, the method is applied to an external NFC sensor, including steps S71 to S74. The steps are described respectively below.

At step S71, it is determined that a first device approaches the external NFC sensor and enters an effective communication range of the external NFC sensor.

In an embodiment of the present disclosure, the first device approaches the external NFC sensor and a distance between the first device and the external NFC sensor reaches an NFC effective communication distance, and the NFC information included in the external NFC sensor can be read. In the embodiment of the present disclosure, it can be determined whether information of the second device is written in the external NFC sensor based on the NFC information.

At step S72, in response to the first device approaching the external NFC sensor and entering the effective communication range of the external NFC sensor, it is determined that the information of the second device is not written in the external NFC sensor.

In the embodiment of the present disclosure, if the external NFC sensor is a device dedicated for having the information of the second device written in, and if the first device does not read the NFC information in the NFC sensor, it can be determined that the information of the second device is not written in the external NFC sensor.

Further, the external NFC sensor may also include information of different second devices. The information of different second devices has different identifiers, and in response to the first device not reading the corresponding identifier, it is determined that the information of the second device is not written in the external NFC sensor.

At step S73, the information of the second device is generated.

In the embodiment of the present disclosure, in response to the first device approaching the external NFC sensor and entering the effective communication range of the external NFC sensor, the information of the second device is generated according to a device type and a device performance of the second device. The information of the second device may be stored in a terminal or a cloud server, and the information of the second device may be retrieved from a device identifier library of the terminal or the cloud server. The information of the second device may include a model of the second device and a code that uniquely identifies the second device.

At step S74, the information of the second device is written into the external NFC sensor.

According to the embodiment of the present disclosure, in response to the first device approaching the external NFC sensor and entering the effective communication range of the external NFC sensor, the information of the second device is generated, and the information of the second device is written into the external NFC sensor, such that writing the information of the second device into the NFC sensor is realized, and it is convenient for the first device to obtain related information of the second device by reading the information of the second device in the NFC sensor.

Further, in the embodiment of the present disclosure, the information of the second device written in the external NFC sensor can be updated.

Figure 9:
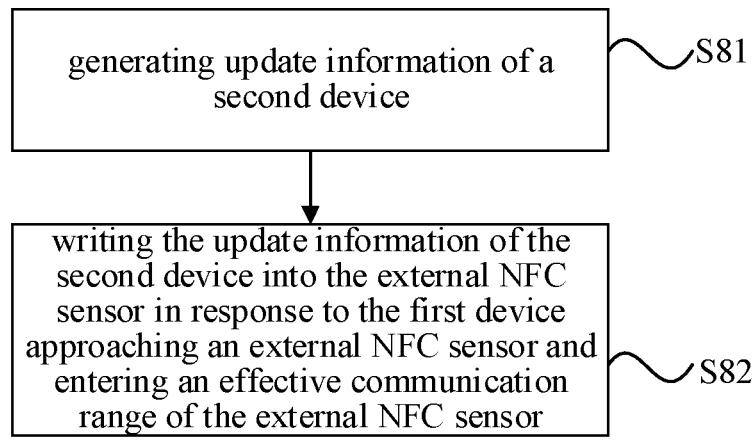
FIG. 9 is a flowchart of a method for writing NFC information according to another embodiment of the present disclosure.

FIG. 9 is a flowchart of a method for writing NFC information according to another embodiment of the present disclosure. As illustrated in FIG. 9, the method includes steps S81 to S82. The steps are described respectively below.

At step S81, update information of a second device is generated.

In the embodiment of the present disclosure, when the second device is replaced, the second device is added or reduced, or device connection information of the second device is changed, the update information of the second device is generated. The generated update information of the second device may be stored in a terminal or a cloud server.

In the embodiment of the present disclosure, a first device generates the update information of the second device, which is usually triggered by the user.

At step S82, in response to the first device approaching an external NFC sensor and entering an effective communication range of the external NFC sensor, the update information of the second device is written into the external NFC sensor.

According to the embodiment of the present disclosure, the update information of the second device is generated, and the update information of the second device is written into the external NFC sensor in response to the first device approaching the external NFC sensor and entering the effective communication range of the external NFC sensor, so that the writing of the update information of the second device is realized.

In the embodiment of the present disclosure, the writing of the information of the second device and/or the writing of the update information of the second device may be performed based on a preset application. For example, the writing can be performed by associating the second device, the external NFC sensor and an application of the terminal.

Figure 10:
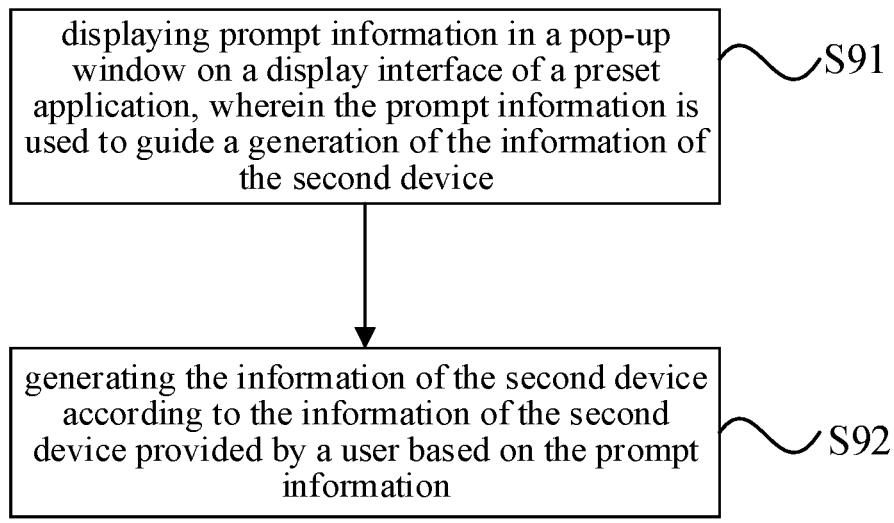
FIG. 10 is a flowchart of a method for writing NFC information according to a still embodiment of the present disclosure.

FIG. 10 is a flowchart of a method for writing NFC information according to yet another embodiment of the present disclosure. As illustrated in FIG. 10, steps S91 to S92 are included, and each step is introduced below.

At step S91, prompt information is displayed in a pop-up window on a display interface of a preset application, and the prompt information is used to guide a generation of the information of the second device.

In the embodiment of the present disclosure, the user may perform the writing of the information of the second device on the preset application of a mobile terminal. In response to a distance between a first device and an external NFC sensor reaches an effective communication range of short-range communication, it can be determined whether a current preset application of the first device is in a running state, and if the preset application is in the running state, then prompt information for guiding the generation of the information of the second device is directly popped up. If the preset application is not in the running state, the user may be prompted to open the preset application, and after the user opens the preset application, the prompt information for guiding the generation of the information of the second device is popped up.

The prompt information is displayed in the pop-up window on the display interface of the preset application of the first device, and the prompt information is sent to the user. The user may perform operations according to the prompt information to realize the generation of the information of the second device. The generated information of the second device is written into the external NFC sensor.

At step S92, the information of the second device is generated according to the information of the second device provided by a user based on the prompt information.

The information of the second device is generated according to the information of the second device selected by the user.

According to the embodiment of the present disclosure, the prompt information is displayed in the pop-up window on the display interface of the preset application. The prompt information is used to guide the generation of the information of the second device, and the information of the second device is generated based on the information of the second device provided by the user based on the prompt information. The generated information of the second device is written into the external NFC sensor for access by the first device, so that the first device may conveniently and safely obtain related information on the second device.

Based on the same concept, the embodiments of the present disclosure also provide an apparatus for controlling an application.

It can be understood that, in order to implement the above functions, the apparatus for controlling an application according to the embodiments of the present disclosure includes corresponding hardware structures and/or software modules for executing each function. In combination with the units and algorithm steps of the examples disclosed in the embodiments of the present disclosure, the embodiments of the present disclosure are implemented in the form of hardware or a combination of hardware and computer software. Whether a certain function is executed by hardware or computer software-driven hardware depends on the specific application and design constraint conditions of the technical solution. Those skilled in the art uses different methods for each specific application to implement the described functions, but such implementation should not be considered as going beyond the scope of the technical solution of the embodiments of the present disclosure.

Figure 11:
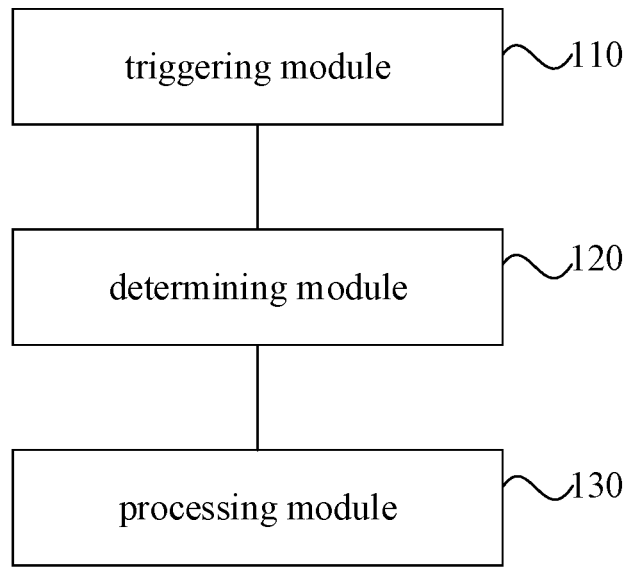
FIG. 11 is a block diagram of an apparatus for controlling an application according to an embodiment.

FIG. 11 is a block diagram of an apparatus for controlling an application according to an embodiment. As illustrated in FIG. 11, the apparatus includes: a triggering module 110, a determining module 120 and a processing module 130, which will be described below.

The triggering module 110 can be configured to trigger reading of information of a second device included in a near-field communication (NFC) sensor in response to a distance between a first device and the NFC sensor external to the first device reaches an NFC effective communication distance, and to determine the second device based on the information of the second device.

The determining module 120 can be configured to determine a function currently executed by the first device, and to determine a capability of the second device.

The processing module 130 can be configured to switch to the second device to continue to execute the function in response to the capability of the second device matching the function currently executed by the first device.

In an embodiment of the present disclosure, the processing module 130 is further configured to: switch to the second device to continue to execute a part of the function that matches the capability of the second device in response to the capability of the second device matching the part of the function currently executed by the first device.

In an embodiment of the present disclosure, the apparatus further includes: a sending module, configured to send the function currently executed by the first device and the information of the second device to a cloud server.

The determining module 120 can be further configured to determine the capability of the second device by the cloud server.

The processing module 130 can be further configured to switch to the second device to continue to execute the function according to an instruction of the cloud server in response to determining by the cloud server that the capability of the second device matches the function currently executed by the first device.

In an embodiment of the present disclosure, the function currently executed by the first device includes an active application of the first device and a function currently executed by the active application, and the capability of the second device includes hardware provided by the second device and/or applications currently installed on the second device.

The processing module 130 can be configured to: determine that the capability of the second device matches the function currently executed by the first device, in response to the second device being installed with the active application of the first device or an application with the same function as the function currently executed by the active application, or the second device being capable of installing with the active application. Or the processing module 130 can be configured to determine hardware required to execute the function according to the function currently executed by the first device, and to determine that the capability of the second device matches the function currently executed by the first device in response to the second device having the hardware required to execute the function.

In an embodiment of the present disclosure, the function currently executed by the first device includes an active application of the first device and a function currently executed by the active application, and the capability of the second device includes hardware provided by the second device and/or applications currently installed on the second device.

The processing module 130 can be configured to determine hardware required to execute the function according to the function currently executed by the first device, and to determine that the capability of the second device matches the function currently executed by the first device in response to the second device having a part of the hardware required to execute the function and the part of the hardware being capable of executing the part of the function.

In an embodiment of the present disclosure, the processing module 130 can be configured to control the first device to stop executing the function and determine an application running breakpoint, and to switch to the second device to execute the function from the application running breakpoint. Or the processing module 130 can be configured to determine a current running point of the function currently executed by the first device, and to control the second device to execute the function from the current running point.

In an embodiment of the present disclosure, the apparatus further includes: a presetting module, configured to preset at least one preset application running on the second device when switching to the second device and a function executed by each of the at least one application.

The determining module 120 can be further configured to determine that an application running on the first device and a function executed by the application belong to the at least one application.

In an embodiment of the present disclosure, the information of the second device relates to a plurality of second devices, and the determining module 120 can be further configured to determine capability information of the plurality of second devices included in the information of the second device.

The processing module 130 can be further configured to determine a target second device whose capability matches the function currently executed by the first device from the plurality of second devices, and to switch to the target second device to continue to execute the function.

In an embodiment of the present disclosure, the processing module 130 can be further configured to: determine one of the plurality of the second devices having the shortest distance from the first device as the target second device in response to the plurality of the second devices having the same capability; or determine one of the plurality of the second devices having the strongest capability for executing the function as the target second device in response to the plurality of the second devices having different capabilities; or determine one of the plurality of the second devices having the highest priority for executing the function as the target second device based on preset device priorities.

Based on the same concept, the embodiments of the present disclosure also provide an apparatus for controlling an application.

Figure 12:
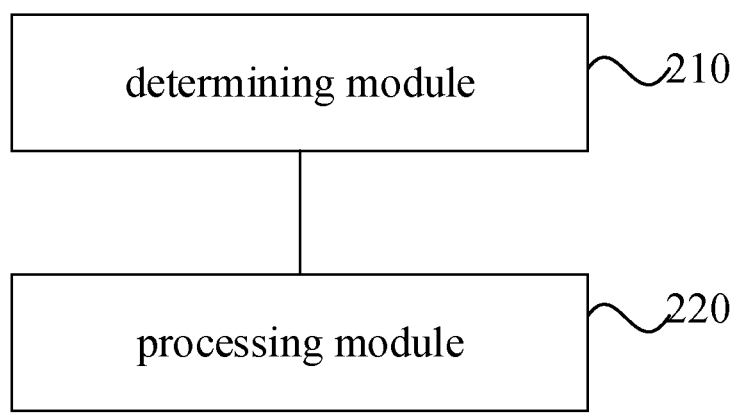
FIG. 12 is a block diagram of an apparatus for controlling an application according to an embodiment.

FIG. 12 is a block diagram of an apparatus for controlling an application according to an embodiment. As illustrated in FIG. 12, the apparatus includes a determining module 210 and a processing module 220, which will be described below.

The determining module 210 is configured to determine whether a distance between a first device and an external NFC sensor reaches an NFC effective communication distance.

The processing module 220 is configured to trigger a second device to continue to execute a function currently executed by the first device in response to the distance between the first device and the external NFC sensor reaching the NFC effective communication distance and a capability of the second device matching the function.

In an embodiment of the present disclosure, the processing module 220 is further configured to trigger the second device to continue to execute a part of the function that matches the capability of the second device in response to the capability of the second device matching the part of the function currently executed by the first device.

In an embodiment of the present disclosure, the function currently executed by the first device includes an active application of the first device and a function currently executed by the active application, and the capability of the second device includes hardware provided by the second device and/or applications currently installed on the second device. The capability of the second device matching the function comprises: the second device being installed with the active application of the first device or an application with the same function as the function currently executed by the active application, or the second device being capable of installing with the active application; or the second device having hardware required to execute the function.

In an embodiment of the present disclosure, the function currently executed by the first device includes an active application of the first device and the function currently executed by the active application, and the capability of the second device includes hardware provided by the second device and/or applications currently installed on the second device. The capability of the second device matching the part of the function comprises: the second device having a part of hardware required to execute the function, and the part of the hardware being capable of executing the part of the function.

Based on the same concept, embodiments of the present disclosure also provide an apparatus for writing NFC information.

Figure 13:
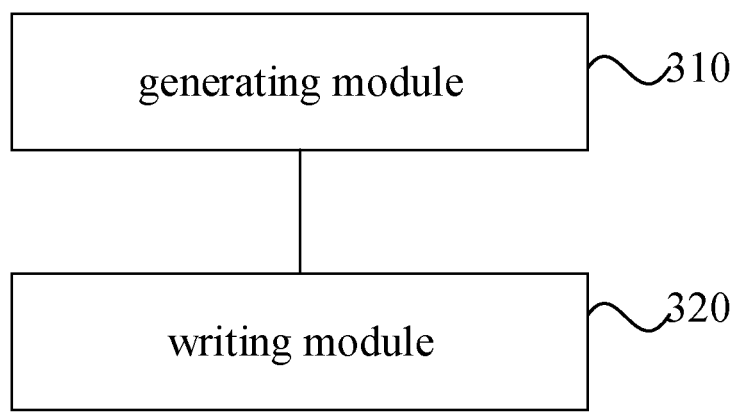
FIG. 13 is a block diagram of an apparatus for writing NFC information according to an embodiment.

FIG. 13 is a block diagram of an apparatus for writing NFC information according to an embodiment. As illustrated in FIG. 13, the apparatus includes: a generating module 310 and a writing module 320, which will be described below.

The generating module 310 can be configured to generate information of a second device and write the information of the second device into an external NFC sensor in response to a first device approaching the external NFC sensor and entering an effective communication range of the external NFC sensor and in response to determining that the information of the second device is not written in the external NFC sensor. Or the generating module 310 can be configured to generate the information of the second device.

The writing module 320 is configured to write the information of the second device into the external NFC sensor. Or the writing module 320 is configured to write the information of the second device into the external NFC sensor in response to the first device approaching the external NFC sensor and entering the effective communication range of the external NFC sensor.

In an embodiment of the present disclosure, the generating module 310 generates the information of the second device by: displaying prompt information in a pop-up window on a display interface of a preset application, in which the prompt information is used to guide a generation of the information of the second device, and generating the information of the second device according to the information of the second device provided by a user based on the prompt information.

In an embodiment of the present disclosure, the generating module 310 can be further configured to generate update information of the second device. The writing module 320 can be configured to write the update information of the second device into the external NFC sensor in response to the first device approaching the external NFC sensor and entering the effective communication range.

Regarding the apparatus in the above embodiments, the specific manner in which each module performs operation has been described in detail in the method embodiments, and detailed description are not given here.

Figure 14:
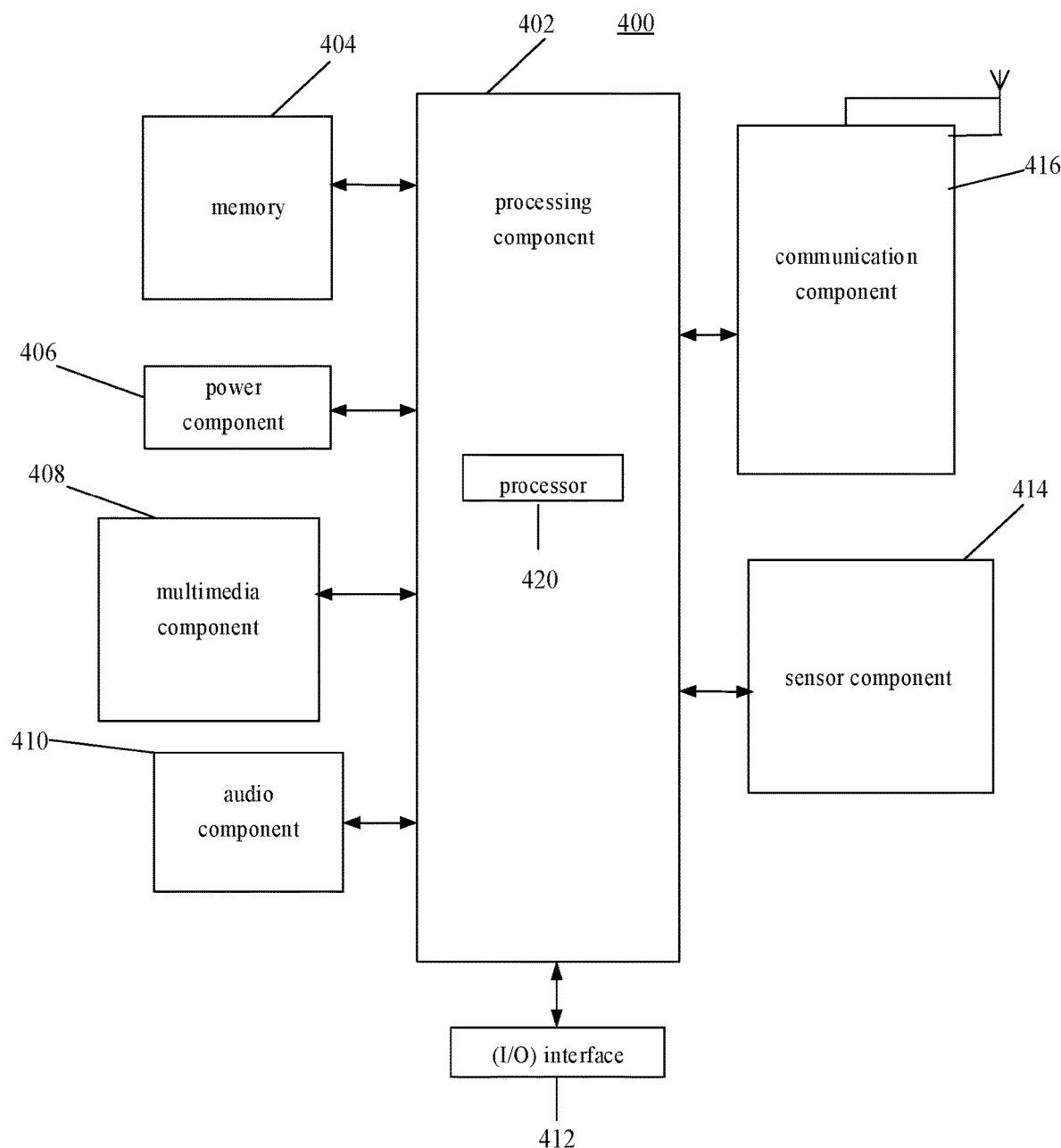
FIG. 14 is a block diagram of a device for controlling an application according to an embodiment.

FIG. 14 is a block diagram of a device 400 for controlling an application according to an embodiment of the present disclosure. For example, the device 400 may be a mobile phone, a computer, a digital broadcasting terminal, a message transceiver device, a game console, a tablet device, a medical device, a fitness device and a personal digital assistant.

Referring to FIG. 14, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front-facing camera and/or a rear-facing camera. When the device 400 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 410 is configured to output and/or input audio signals. For example, the audio component 410 includes a microphone (MIC) configured to receive an external audio signal when the device 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as Wi-Fi, 2G, or 3G, or a combination thereof. In one embodiment, the communication component 416 receives a broadcast signal or broadcast associated information from an external broadcast management system via a broadcast channel. In one embodiment, the communication component 416 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In some embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 404, executable by the processor 420 in the device 400, for performing the above-described methods. For example, the non-transitory computer-readable storage medium may be a ROM, a RAM, a CD-ROM, a magnetic tape, a floppy disc, an optical data storage device, and the like.

It is understood that in this disclosure, "plurality" refers to two or more, and other quantifiers are similar. In addition, it is noted that "and/or" in the text only describes a relation of the related objects and indicates three relations, for example, "A and/or B" indicates three conditions, i.e., A exists alone, A and B exist simultaneously, and B exists alone. The character "/" generally indicates that it is either the former related object or the latter related object. The singular forms "a", "said" and "the" are also intended to include the majority form unless the context clearly indicates other meanings.

It is further understood that terms such as "first" and "second" are used to describe various information, but the information should not be limited to these terms. These terms are only used to distinguish the same type of information from each other, and do not indicate a specific order or importance. In fact, the expressions "first" and "second" may be used interchangeably. For example, without departing from the scope of the present disclosure, the first information may also be referred to as the second information, and similarly, the second information may also be referred to as the first information.

It is further understood that the terms "center", "vertical", "horizontal", "front", "rear", "upper", "lower", "left", "right", "vertical", "horizontal", "top", "bottom", "inner" and "outer" indicating orientations or positional relations based on the orientations or positional relations shown in the drawings, are only for the convenience of describing the embodiments and simplifying the description, rather than indicating or implying that the device or element must have a specific orientation or be constructed and operated in a specific orientation.

In the drawings, same or similar reference numerals indicate same or similar elements or elements with same or similar functions. The described embodiments are part of the embodiments of the present disclosure, but not all of the embodiments. The embodiments described above with reference to the drawings are exemplary, and are intended to explain the present disclosure, but should not be construed as limiting the present disclosure. Based on the embodiments in the present disclosure, all other embodiments obtained by those of ordinary skill in the art without inventive works shall fall within the protection scope of the present disclosure. The foregoing describes the embodiments of the present disclosure in detail in combination with the accompanying drawings.

It is further understood that unless otherwise specified, "connection" means that there is no direct connection between the two with other components, and there is an indirect connection between the two with other elements.

It is further understood that although the operations are described in a specific order in the drawings in the embodiments of the present disclosure, it should not be construed as requiring that the operations are performed in the specific order shown or in a serial order, or performed all to get the desired result. In certain environments, multitasking and parallel processing may be advantageous.

Those skilled in the art easily think of other embodiments of the present disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A method for controlling an application, comprising:
   triggering reading of information of a second device included in a near-field communication (NFC) sensor in response to a distance between a first device and the NFC sensor external to the first device reaching an NFC effective communication distance, and determining the second device based on the information of the second device;
   determining a function currently executed by the first device, and determining a capability of the second device;
   switching to the second device to continue to execute the function in response to determining that the capability of the second device matches the function; and
   displaying, by the first device, relevant information indicating that the second device synchronously executes the function currently executed by the first device;
   wherein the function currently executed by the first device comprises an active application of the first device and a function currently executed by the active application, and the capability of the second device comprises applications currently installed on the second device;
   and the determining that the capability of the second device matches the function comprises:
   determining that the capability of the second device matches the function currently executed by the first device, in response to the second device being installed with at least one of:
   the active application of the first device,
   an application with the same function as the function currently executed by the active application and
   an application with the same function as a part of the function currently executed by the active application.

2. The method according to claim 1, further comprising:
   switching to the second device to continue to execute a part of the function that matches the capability of the second device in response to determining that the capability of the second device matches the part of the function.

3. The method according to claim 2, wherein the capability of the second device comprises
   hardware provided by the second device;
   and wherein the determining that the capability of the second device matches the part of the function comprises:
   determining hardware required to execute the function currently executed by the first device according to the function currently executed by the first device; and
   determining that the capability of the second device matches the part of the function currently executed by the first device in response to the second device having a part of the hardware required to execute the function currently executed by the first device and the part of the hardware being capable of executing the part of the function currently executed by the first device.

4. The method according to claim 1, further comprising:
   sending the function and the information of the second device to a cloud server;
   wherein the determining the capability of the second device comprises:
   determining the capability of the second device by the cloud server;
   wherein the switching to the second device comprises:

switching to the second device to continue to execute the function according to an instruction of the cloud server in response to determining by the cloud server that the capability of the second device matches the function.

5. The method according to claim 1, wherein the determining that the capability of the second device matches the function comprises:
determining that the capability of the second device matches the function currently executed by the first device, in response to the second device being capable of installing with the active application.

6. The method according to claim 1, wherein the capability of the second device comprises
hardware provided by the second device;
and the determining that the capability of the second device matches the function comprises:
determining hardware required to execute the function currently executed by the first device according to the function currently executed by the first device; and
determining that the capability of the second device matches the function currently executed by the first device in response to the second device having the hardware required to execute the function currently executed by the first device.

7. The method according to claim 1, wherein the switching to the second device to continue to execute the function comprises:
controlling the first device to stop executing the function; and
determining an application running breakpoint, and switching to the second device to execute the function from the application running breakpoint.

8. The method according to claim 1, wherein the switching to the second device to continue to execute the function comprises:
determining a current running point of the function currently executed by the first device, and controlling the second device to execute the function from the current running point.

9. The method according to claim 1, further comprising:
presetting at least one application running on the second device when switching to the second device and a function executed by each of the at least one application; and
determining that an application running on the first device and a function executed by the application belong to the at least one application.

10. The method according to claim 1, wherein the information of the second device relates to a plurality of second devices, and wherein
the determining the capability of the second device comprises:
determining capability information of the plurality of second devices included in the information of the second device;
wherein, the switching to the second device to continue to execute the function in response to determining that the capability of the second device matches the function comprises:
determining a target second device whose capability matches the function from the plurality of second devices; and
switching to the target second device to continue to execute the function.

11. The method according to claim 10, wherein the determining the target second device whose capability matches the function from the plurality of the second devices comprises one of the following:
determining one of the plurality of the second devices having the shortest distance from the first device as the target second device in response to the plurality of the second devices having the same capability;
determining one of the plurality of the second devices having the strongest capability for executing the function as the target second device in response to the plurality of the second devices having different capabilities; and
determining one of the plurality of the second devices having the highest priority for executing the function as the target second device based on preset device priorities.

12. A method for controlling an application, comprising:
triggering a second device to continue to execute a function currently executed by a first device in response to a distance between the first device and an external NFC sensor external to the first device reaching an NFC effective communication distance and a capability of the second device matching the function, and
instructing the first device to display relevant information indicating that the second device synchronously executes the function currently executed by the first device;
wherein the function currently executed by the first device comprises an active application of the first device and a function currently executed by the active application, and the capability of the second device comprises applications currently installed on the second device;
wherein the capability of the second device matching the function comprises at least one of:
the second device being installed with at least one of:
the active application of the first device,
an application with the same function as the function currently executed by the active application and
an application with the same function as a part of the function currently executed by the active application.

13. The method according to claim 12, further comprising:
triggering the second device to continue to execute a part of the function that matches the capability of the second device in response to the capability of the second device matching the part of the function.

14. The method according to claim 13, wherein the capability of the second device comprises
hardware provided by the second device;
and wherein the capability of the second device matching the part of the function comprises:
the second device having a part of hardware required to execute the function currently executed by the first device, and the part of the hardware being capable of executing the part of the function currently executed by the first device.

15. The method according to claim 12, wherein the capability of the second device comprises
hardware provided by the second device;
and wherein the capability of the second device matching the function comprises at least one of:
the second device being capable of installing with the active application; and
the second device having hardware required to execute the function currently executed by the first device.

16. A device for controlling an application, comprising:
a processor;
a memory for storing instructions executable by the processor;

wherein the processor is configured to execute the method for controlling an application according to claim 12.

17. A device for controlling an application, comprising:

a processor;

a memory for storing instructions executable by the processor;

wherein the processor is configured to execute the instructions for controlling an application comprising:

triggering reading of information of a second device included in a near-field communication (NFC) sensor in response to a distance between a first device and the NFC sensor external to the first device reaching an NFC effective communication distance, and determining the second device based on the information of the second device;

determining a function currently executed by the first device, and determining a capability of the second device;

switching to the second device to continue to execute the function in response to determining that the capability of the second device matches the function; and displaying, by the first device, relevant information indicating that the second device synchronously executes the function currently executed by the first device;

wherein the function currently executed by the first device comprises an active application of the first device and a function currently executed by the active application, and the capability of the second device comprises applications currently installed on the second device;

and the determining that the capability of the second device matches the function comprises:

determining that the capability of the second device matches the function currently executed by the first device, in response to the second device being installed with at least one of:

the active application of the first device, an application with the same function as the function currently executed by the active application and an application with the same function as a part of the function currently executed by the active application.

18. The device according to claim 17, wherein the processor is further configured to perform an operation of:

switching to the second device to continue to execute a part of the function that matches the capability of the second device in response to determining that the capability of the second device matches the part of the function.

19. The device according to claim 17, wherein the processor is further configured to perform an operation of:

sending the function and the information of the second device to a cloud server;

wherein the determining the capability of the second device comprises:

determining the capability of the second device by the cloud server;

wherein the switching to the second device to continue to execute the function in response to determining that the capability of the second device matches the function comprises:

switching to the second device to continue to execute the function according to an instruction of the cloud server in response to determining by the cloud server that the capability of the second device matches the function.

* * * * *